Patented Mar. 29, 1927.

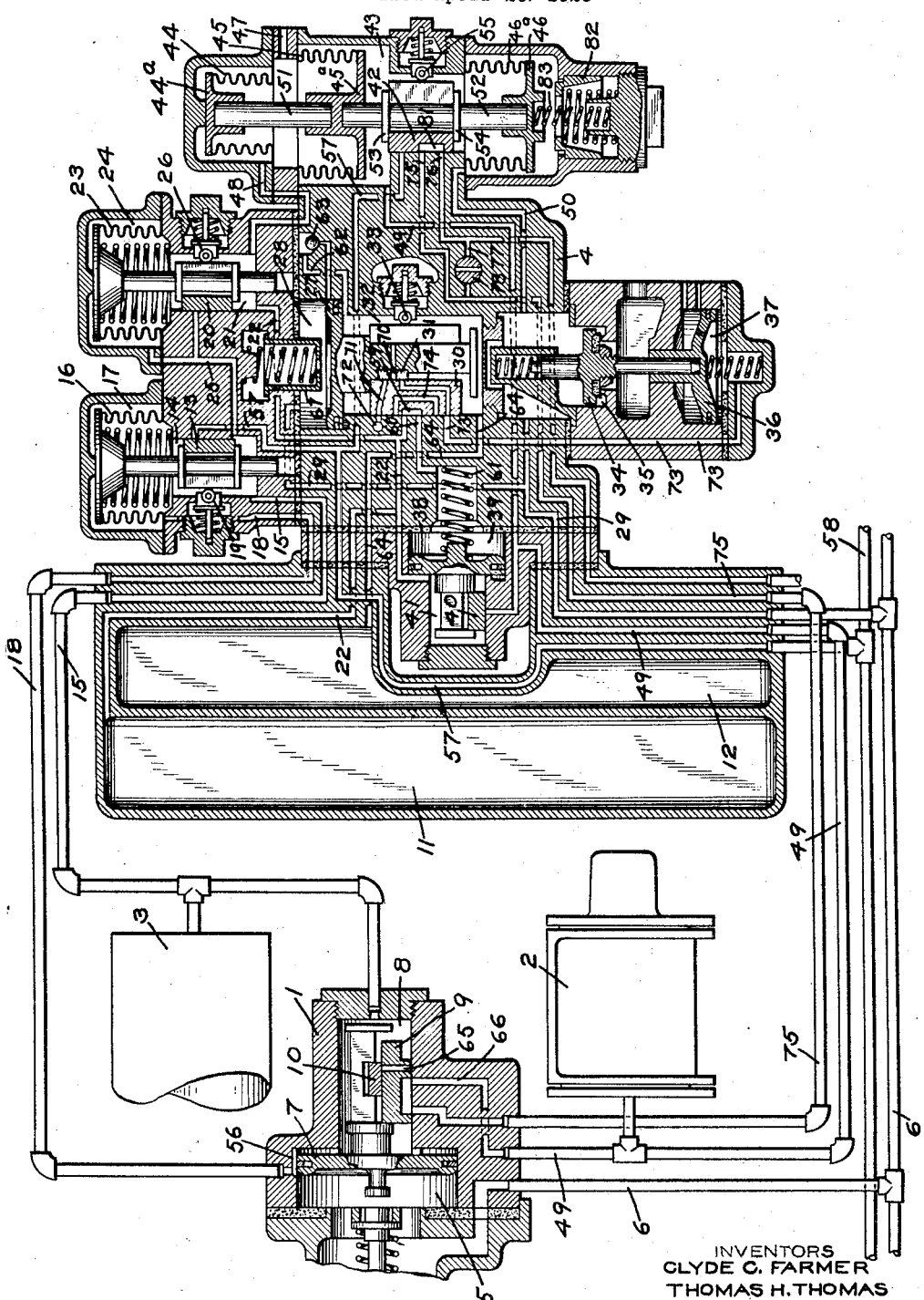

1,622,428

UNITED STATES PATENT OFFICE.

CLYDE C. FARMER, OF PITTSBURGH, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed April 20, 1925. Serial No. 24,361.

This invention relates to fluid pressure brakes and more particularly to a brake equipment of the type having a brake cylinder pressure maintaining feature.

The principal object of our invention is to provide a brake equipment of the above type having improved means for maintaining brake cylinder pressure.

Other objects and advantages will appear from the following more detailed description of the invention.

In the accompanying drawing, the single figure is a diagrammatically sectional view of a fluid pressure brake equipment, with our invention applied thereto.

According to our invention, means are provided for controlling the supply of fluid under pressure to the brake cylinder under ordinary conditions, and in addition thereto we provide auxiliary means for maintaining the pressure of fluid supplied to the brake cylinder against leakage and also for augmenting the pressure of fluid so supplied, if the pressure in the brake cylinder does not reach a predetermined desired degree, due to excessive piston travel and the like.

As shown in the drawing, the equipment may comprise a brake application valve device, such as the ordinary triple valve 1, a brake cylinder 2, an auxiliary reservoir 3 and a valve device 4.

The triple valve device 1 may comprise a casing having a piston chamber 5 connected to the brake pipe 6 and containing a piston 7, also a valve chamber 8 connected to the auxiliary reservoir 3 and containing a main slide valve 9 and a graduating valve 10 adapted to be operated by the piston 7.

The valve device 4 may comprise a casing in which is formed an emergency reservoir 11 and a quick action chamber 12. Contained within the casing are a quick recharging valve device, an emergency reservoir charging valve device, an emergency valve device, a quick action valve device, a valve device for controlling the supply of fluid under pressure from the emergency reservoir to the brake cylinder and a maintaining valve device.

The quick recharging valve device may comprise a slide valve 13 contained in a valve chamber 14, which is connected by passage and pipe 15 to the auxiliary reservoir 3. The slide valve 13 is operated by a diaphragm 16 contained in a diaphragm chamber 17, said diaphragm being subject on one side to the pressure of fluid in the brake pipe 6 as supplied from triple valve piston chamber 5 through pipe and passage 18, and on the other side to the pressure of fluid in the valve chamber 14. A spring pressed roller 19 engaging the slide valve 13 is provided, to prevent the lifting of said valve from its seat, by fluid under pressure acting on the under side thereof.

The emergency reservoir charging valve device may comprise a similar slide valve 20 contained in a valve chamber 21, which is connected by passage 22 to the emergency reservoir 11. The slide valve 20 is operated by a diaphragm 23 contained in diaphragm chamber 24, said diaphragm being subject on one side to the pressure of fluid in the auxiliary reservoir as supplied from valve chamber 14 through passage 25 and on the opposite side to the pressure of fluid in valve chamber 21. A spring pressed roller 26 engaging the slide valve 20 is provided to prevent the lifting of said slide valve from its seat, by fluid under pressure acting on the under side thereof.

The emergency valve device may comprise a piston 27 contained in a piston chamber 28, which is connected by a passage 29 to the brake pipe 6, and a main slide valve 30 and an auxiliary slide valve 31 contained in valve chamber 32 and adapted to be operated by the piston 27. A spring pressed roller 33 is provided to prevent the lifting of the slide valve 30 from its seat by fluid under pressure acting on the under side thereof. A spring stop 67 is provided in order to define service position of the emergency piston 27.

The quick action valve device may comprise a brake pipe vent valve 34 contained in a valve chamber 35, which is connected by passage 29 to the brake pipe 6 and a quick action piston 36 contained in piston chamber 37 and operatively connected to the valve 34.

The valve device for controlling the supply of fluid from the equalizing reservoir to the brake cylinder may comprise a piston 38 contained in piston chamber 39 and a slide valve 40 contained in valve chamber 41 and adapted to be operated by the piston 38.

The maintaining valve device may comprise a slide valve 42 contained in valve chamber 43 and held to its seat by a spring pressed roller 55 engaging the wings thereof, said valve being adapted to be operated by one or more of the diaphragms 44, 45, and 46, which are preferably of the bellows type, and attached respectively to the diaphragm plates 44ª, 45ª, and 46ª. The diaphragms 44 and 45 are so disposed as to form a chamber intermediate them, which is connected to atmosphere by passage 47, and they are respectively subject on their opposite sides to the pressure of fluid in the emergency reservoir as supplied from valve chamber 21 through passage 48 and to the pressure of fluid in the valve chamber 43, which is connected to the brake cylinder 2 by passage and pipe 49.

The diaphragm 46 is subject on one side to the pressure of fluid in valve chamber 43 and consequently the brake cylinder 2, and on the opposite side to the pressure of fluid in the brake pipe 6, as supplied from valve chamber 35 through passage 50, and also to the pressure of a spring 83. A loose fitting stem 51 operatively connects the diaphragm plates 44ª and 45ª, while a loose fitting stem 52, having shoulders 53 and 54 engaging the slide valve 42, operatively connects the diaphragm plates 45ª and 46ª, so that only an inward movement of the diaphragms 44 and 45, and an inward movement of the diaphragm 46, will operate the slide valve 42.

Disposed in the casing at the outer face of the diaphragm plate 46ª is a spring pressed stop 82, having an opening in its upper face to admit the spring 83, which engages the outer face of the diaphragm plate 46ª.

In order that the release of the brakes may be controlled by the maintaining valve device, the usual exhaust from the triple valve device is connected by a pipe and passage 75 to the seat of slide valve 42 of the maintaining valve device. Another passage 76 leads from said slide valve seat to atmosphere, and a passage 77 is connected to said passage and to the passage 75. Interposed in the passage 77 is a two position cock 78 having one position in which the passages 75 and 76 are directly connected through passage 77 and another position in which said connection is cut off.

In operation, fluid under pressure from the brake pipe 6 flows to piston chamber 5 of the triple valve device, thence through the feed groove 56 to valve chamber 8 and to the auxiliary reservoir 3. Fuid from piston chamber 5 also flows through pipe and passage 18 to diaphragm chamber 17 of the quick recharging valve device.

The fluid under pressure in diaphragm chamber 17 acting on the diaphragm 16 forces said diaphragm inwardly with a consequent movement of the slide valve 13, so as to uncover a passage 57 leading from the slide valve seat to a maintaining pipe 58, which in turn is connected to a source of fluid, such as the main reservoir, and thereby fluid under pressure is supplied from the maintaining pipe 58 to the valve chamber 14, so that a quick recharge of the auxiliary reservoir may be effected.

Fluid under pressure from the valve chamber 14 flows through a passage 25 to diaphragm chamber 24, where it acts to move the diaphragm 23 inwardly, with a consequent movement of the slide valve 20. This movement of the slide valve 20 uncovers a branch of passage 25 leading to the slide valve seat, so that fluid is supplied from valve chamber 14 to valve chamber 21 of the emergency reservoir charging valve device. From valve chamber 21 fluid flows through a passage 22 to the emergency reservoir 11. Fluid also flows from valve chamber 21 to valve chamber 41 of the valve device for controlling the supply of fluid from the emergency reservoir to the brake cylinder 2.

A branch of the passage 22 supplies fluid from valve chamber 21 through cavity 59 in the slide valve 30 of the emergency valve device and passage 60 to piston chamber 39, thereby equalizing the fluid pressures on opposite sides of the piston 38 and permitting spring 61 to force said piston to its innermost position. Fluid under pressure from the emergency reservoir 11 is supplied through passage 22, valve chamber 21 and passage 48 to one side of the diaphragm 44 of the maintaining valve device.

A passage 29 connected to the brake pipe 6 supplies fluid under pressure to piston chamber 28 of the emergency valve device and to valve chamber 35 of the quick action valve device, from whence it flows through passage 50 to one side of the diaphragm 46 of the maintaining valve device. Fluid from piston chamber 28 flows through passage 62 past ball check 63 to valve chamber 32, thence through passage 64 to the quick action chamber 12, charging the same.

When it is desired to produce a service application of the brakes, the pressure in the brake pipe 6 is reduced in the usual way, causing the piston 7 of the triple valve device to move outwardly and consequently shift the slide valve 9 and the graduating valve 10 to service position. In this position a port 65 of the slide valve 9 registers with a passage 66 in the slide valve seat so as to supply fluid under pressure from the valve chamber 8 and the auxiliary reservoir 3 through pipe 49 to the brake cylinder 2.

The reduction in brake pipe pressure at a service rate causes the piston 27 of the emergency valve device to move outwardly until it engages the stop 67. This movement of piston 27 is just sufficient to shift the auxiliary slide valve 31 to a position so that a port 70 in said slide valve will register with a port 71, in the main slide valve 30, which in turn registers with the atmospheric exhaust port 72. This it will be seen permits fluid from valve chamber 32 and the quick action chamber 12 to pass to atmosphere, and thereby prevent a movement of the piston 27 and consequently slide valve 30 to emergency position.

When the pressure of fluid in the valve chamber 32 and consequently in the quick action chamber has been reduced to a degree slightly less than the reduced brake pipe pressure, the higher pressure in the brake pipe and consequently in piston chamber 28 will shift the piston 27 to its innermost position, with a consequent movement of the auxiliary slide valve 31, so as to prevent further escape of fluid from said valve chamber, and the quick action chamber.

The usual standard fluid pressure brake is designed so that the first reduction in brake pipe pressure of five pounds functions to supply sufficient fluid under pressure to the brake cylinder to move the brake cylinder piston its normal travel, which is usually taken at eight inches, and for every additional pound of brake pipe reduction, to increase the brake cylinder pressure by a predetermined amount, such for example as three and one-quarter pounds.

The brake cylinder 2 is in communication through pipe and passage 49 with chamber 43 of the maintaining valve device, so that the pressure of fluid in the brake cylinder is always present on one side of the diaphragm 45 and on one side of the diaphragm 46. The spring 83 acting on the other side of the diaphragm plate 46$^a$ is of such resistance that the maintaining valve device will not move during the first five pounds of brake pipe reduction, and consequently the slide valve 42 will remain in the position shown in the drawing during this reduction.

As the reduction in brake pipe pressure is continued further than five pounds, fluid is supplied to the brake cylinder at the rate of three and one-quarter pounds for every pound reduction in brake pipe pressure, if there is no leakage from the brake cylinder, and if the brake cylinder piston travel does not exceed the normal amount.

The effective areas of the diaphragms 44, 45, and 46 of the brake cylinder pressure maintaining valve device are so related that a balance of fluid pressures between the constant pressure acting on the diaphragm 44 and the brake cylinder and brake pipe pressures acting on the diaphragms 45 and 46 is maintained and consequently there will be no movement of the diaphragms and the slide valve 42 so long as the pressure in the brake cylinder is being built up at the predetermined rate of three and one-quarter pounds for every pound reduction in brake pipe pressure.

However, if by leakage the pressure in the brake cylinder should be reduced below the predetermined amount or by reason of excessive brake cylinder piston travel the pressure should not reach said predetermined amount by operation of the triple valve device, the corresponding deficiency in brake cylinder pressure on the diaphragm 45 of the brake cylinder pressure maintaining valve device, permits the constant pressure acting on the diaphragm 44 to effect the movement of the diaphragms 44 and 45 and consequently the valve 42 to a position in which passage 57 is opened to the valve chamber 43, the spring stop 82 being compressed by this movement. Fluid under pressure is then supplied from the maintaining pipe 58 through passage 57 to chamber 42, thence through passage and pipe 49 to the brake cylinder 2, until the pressure in the brake cylinder and in said chamber has been brought up to the predetermined amount, at which time the pressure of fluid in chamber 42 acting on diaphragm plate 45$^a$ and pressure of fluid from the brake pipe 6, as supplied through passage 50, together with the pressure exerted by spring 83, acting on the outer side of diaphragm plate 46$^a$, will be sufficient to shift the slide valve 42 to its former position, so as to cut off the further supply of fluid from the maintaining pipe 58 to chamber 42 and the brake cylinder.

If it is desired to operate the equipment with the graduated release feature cut out, the cock 78 is placed in a position connecting the passages 75 and 76 through passage 77, so that when the pressure in the brake pipe 6 is raised in the usual way and consequently the triple valve, piston and slide valve shifted to release position, fluid from the brake cylinder 2 will flow through pipe 49, passage 66, cavity 80 in the slide valve 9, pipe and passage 75, passage 77 and passage 76 to atmosphere.

If it is desired to operate with the graduated release feature cut in, the cocks 78 throughout the train are placed in a position cutting off direct communication between passages 75 and 76, so that the release of fluid from the brake cylinder is controlled by the slide valve 42 of the maintaining valve device.

If the brake pipe pressure is gradually increased to effect a graduated release of the brakes, the triple valve piston will be shifted to release position, in which fluid from the brake cylinder 2 will flow through pipe 49, passage 66, cavity 80 in slide valve 9, pipe and passage 75, cavity 81 in the slide valve 42 of the maintaining valve device to exhaust passage 76.

When the pressure in the brake cylinder 2 and consequently in chamber 43 of the maintaining valve device, has been reduced, slightly more than the amount corresponding to the increase in brake pipe pressure, the constant pressure of fluid in the emergency reservoir acting on the outer side of diaphragm 44 will be sufficient to move said diaphragm inwardly. The inward movement of the diaphragm 44 and consequently diaphragm plate 44ᵃ acts through the stems 51 and 52 to shift the slide valve 42 and also to shift the diaphragm plate 46ᵃ outwardly until said diaphragm plate engages the spring pressed stop 82.

In this position of slide valve 42 the cavity 81 does not connect the passages 75 and 76, so that the exhaust passage 76 is cut off from the brake cylinder, and further escape of fluid under pressure from the brake cylinder is prevented. When it is desired to effect a further graduated release of fluid from the brake cylinder, the pressure in the brake pipe 6 is further increased and operates the diaphragm 46 to shift the slide valve 42 inwardly until the cavity 81 in said slide valve connects the passages 75 and 76 and consequently the brake cylinder 2 to atmosphere.

When an emergency application of the brakes is initiated by a sudden reduction of brake pipe pressure, the triple valve piston 7 is shifted to emergency position, with a consequent movement of the slide valve 9, so as to uncover passage 66 in the slide valve seat and thereby supply fluid under pressure from the auxiliary reservoir 3, through passage 66 and pipe 49, to the brake cylinder 2 at an emergency rate. The piston 27 of the emergency valve device is also shifted to emergency position by the sudden reduction in brake pipe pressure and consequently shifts the main slide valve 30 and the auxiliary slide valve 31 to emergency position.

With said slide valve in this position, fluid under pressure from the quick action chamber 12 and valve chamber 32 is supplied through a passage 73, to piston chamber 37 of the quick action valve device. The fluid under pressure so supplied acts on the quick action piston 36, forcing it inwardly so as to unseat the valve 34 and thereby vent fluid under pressure from the valve chamber 34 and the brake pipe 6 to atmosphere, which in turn causes a quick serial venting of the brake pipe throughout the train.

Also in this position, cavity 74 in the slide valve 30 connects passage 60 with the atmospheric exhaust port 72 so as to vent fluid from piston chamber 39 of the valve device for controlling the supply of fluid from the supplemental reservoir to the brake cylinder. The venting of fluid from the piston chamber 39 causes the piston 38 and consequently slide valve 40 to be shifted outwardly to supply position. In this position, fluid under pressure from the valve chamber 41 and the emergency reservoir 11 is supplied through passage and pipe 49 to the brake cylinder 2.

The emergency reservoir charging valve device, of the diaphragm and slide valve type, is provided in order to prevent leakage so that the pressure in the emergency reservoir, and therefore on the outer side of the diaphragm 44, of the maintaining valve device, will be maintained constant.

Having now described our invention, what we claim as new and desire to secure by Letters Patent, is:—

1. In a fluid pressure brake, the combination with a brake pipe and a brake cylinder, of a valve device operated upon a reduction in brake pipe pressure for supplying fluid under pressure to the brake cylinder, and an auxiliary valve device, subject to the pressures of the brake pipe and the brake cylinder for also controlling the supply of fluid under pressure to the brake cylinder.

2. In a fluid pressure brake, the combination with a brake pipe and a brake cylinder, of a valve device operated upon a reduction in brake pipe pressure for supplying fluid under pressure to the brake cylinder, and an auxiliary valve device, biased in one direction by brake cylinder pressure, brake pipe pressure, and the pressure of a spring for also controlling the supply of fluid under pressure to the brake cylinder.

3. In a fluid pressure brake, the combination with a brake pipe and a brake cylinder, of a valve device operated upon a reduction in brake pipe pressure for supplying fluid under pressure to the brake cylinder, and an auxiliary valve device, biased in one direction by a constant pressure and in the opposite direction by brake cylinder pressure, brake pipe pressure, and the pressure of a spring for also controlling the supply of fluid under pressure to the brake cylinder.

4. In a fluid pressure brake, the combination with a brake pipe and a brake cylinder, of a valve device operated upon a reduction in brake pipe pressure for supplying fluid under pressure to the brake cylinder, and an auxiliary valve device comprising a valve for controlling the supply of fluid to the brake cylinder, a movable abutment subject to a constant pressure tending to move said valve in one direction, a movable abutment subject to brake cylinder pressure opposing said constant pressure, and a movable abutment subject to brake pipe pressure and a constant pressure tending to move said valve in the opposite direction.

5. In a fluid pressure brake, the combination with a brake pipe and a brake cylinder, of a valve device operated upon a reduction in brake pipe pressure for supplying fluid under pressure to the brake cylinder, and an auxiliary valve device for also controlling the supply of fluid under pressure to the brake cylinder and subject to a constant pressure for preventing the operation of said valve device until the brake cylinder pressure has been increased to a predetermined degree.

6. In a fluid pressure brake, the combination with a brake pipe and a brake cylinder, of a valve device operated upon a reduction in brake pipe pressure for supplying fluid under pressure to the brake cylinder, and an auxiliary valve device subject to the pressures of the brake cylinder and the brake pipe and operated upon a drop in the brake cylinder pressure relative to the reduced brake pipe pressure for supplying fluid to the brake cylinder, and a spring for opposing movement of said valve device to supply fluid to the brake cylinder until the brake cylinder pressure has been increased to a predetermined degree.

7. In a fluid pressure brake, the combination with a brake pipe and a brake cylinder, of a valve device operated upon a reduction in brake pipe pressure for supplying fluid under pressure to the brake cylinder, and an auxiliary valve device subject in one direction to a constant pressure tending to operate said valve device to supply fluid to the brake cylinder and in the opposite direction to brake pipe pressure and brake cylinder pressure tending to prevent operation of said valve device and also subject to a constant pressure opposing the first mentioned constant pressure for preventing movement of said valve device until the brake cylinder pressure has been increased to a predetermined degree.

8. In a fluid pressure brake, the combination with a brake pipe and a brake cylinder, of a valve device operated upon a reduction in brake pipe pressure for supplying fluid under pressure to the brake cylinder, and an auxiliary valve device comprising a valve for controlling the supply of fluid under pressure to the brake cylinder, a movable abutment subject to a constant pressure tending to operate said valve to supply fluid to the brake cylinder, a movable abutment subject to brake cylinder pressure opposing said constant pressure, and a movable abutment subject on one side to brake cylinder pressure and on the opposite side to brake pipe pressure and a constant pressure and tending to move said valve to cut off the supply of fluid to the brake cylinder.

9. In a fluid pressure brake, the combination with a brake cylinder, of a valve device for maintaining the pressure in the brake cylinder and including a movable abutment subject to fluid at a constant pressure and means for maintaining the pressure constant on said abutment, comprising a valve for controlling the supply of fluid under pressure to said abutment and a flexible diaphragm subject on one side to fluid under pressure and on the other side to the fluid pressure on said abutment for operating said valve.

10. In a fluid pressure brake, the combination with a brake cylinder, of a valve device for maintaining the pressure in the brake cylinder and including a movable abutment subject to fluid at a constant pressure and means for maintaining the pressure constant on said abutment, comprising a slide valve for controlling the supply of fluid under pressure from a source of pressure to said abutment and a leak tight flexible diaphragm subject on one side to the pressure of fluid from said source and on the opposite side to the pressure of fluid on said abutment and the pressure of a spring for operating said valve.

11. In a fluid pressure brake, the combination with a source of fluid under pressure and a receptacle containing fluid under pressure, of a valve for controlling the supply of fluid from said source to said receptacle, and a leak tight flexible diaphragm subject on one side to the pressure of fluid from said source and on the opposite side to the pressure of fluid in said receptacle and the pressure of a spring for operating said valve.

12. In a fluid pressure brake, the combination with a brake cylinder and brake pipe, of a valve device for controlling the supply of fluid under pressure to the brake cylinder comprising means subject to the opposing pressures of the brake pipe and the brake cylinder, a valve operated by said means for supplying fluid to the brake cylinder, and a yielding stop for defining a position of the valve in which the supply of fluid to the brake cylinder is cut off.

13. In a fluid pressure brake, the combination with a brake cylinder and brake pipe, of a main valve device for supplying fluid under pressure to the brake cylinder at a predetermined ratio between the reduction in brake pipe pressure and the increase in brake cylinder pressure and an auxiliary valve device inactive to supply fluid to the brake cylinder so long as the brake cylinder pressure as supplied by the main valve device is at said predetermined ratio and operated when the brake cylinder pressure is less than said predetermined ratio for supplying fluid to the brake cylinder to restore said ratio.

In testimony whereof we have hereunto set our hands.

CLYDE C. FARMER.
THOMAS H. THOMAS.